United States Patent
Bentz et al.

[11] Patent Number: 5,243,327
[45] Date of Patent: Sep. 7, 1993

[54] AUDIBLE ALARM FOR MOTION DETECTION USING DUAL MODE TRANSDUCER

[75] Inventors: Allan J. Bentz, Syracuse; Timothy V. Wilson, Morrisville; Keith J. Tupper; Kevin L. Reedy, both of Camillus, all of N.Y.

[73] Assignee: K-II Enterprises Div. of WRTB, Inc., Camillus, N.Y.

[21] Appl. No.: 857,454

[22] Filed: Mar. 25, 1992

[51] Int. Cl.⁵ .................... G08B 13/00; H04B 1/02
[52] U.S. Cl. ........................ 340/566; 340/384 E; 367/139
[58] Field of Search ............. 340/566, 573, 527, 691, 340/384 E; 310/311; 119/29; 367/139; 331/64-65

[56] References Cited

U.S. PATENT DOCUMENTS

| | | | |
|---|---|---|---|
| 3,750,127 | 7/1973 | Ayers et al. | 340/566 |
| 4,170,769 | 10/1979 | Morris et al. | 340/384 E |
| 4,386,341 | 5/1983 | Yamamoto | 340/384 E |
| 4,470,040 | 9/1984 | Kaminishi | 340/566 |
| 4,712,098 | 12/1987 | Laing | 340/669 |
| 4,758,824 | 7/1988 | Young | 340/566 |
| 4,876,674 | 10/1989 | Parmely et al. | 367/139 |
| 4,965,552 | 10/1990 | Price | 340/566 |
| 4,974,850 | 12/1990 | Hyman et al. | 273/1 GG |
| 5,054,007 | 10/1991 | McDonough | 367/139 |
| 5,061,918 | 10/1991 | Hunter | 340/573 |
| 5,168,263 | 12/1992 | Drucker | 340/384 E X |

*Primary Examiner*—Thomas Mullen
*Attorney, Agent, or Firm*—Wall and Roehrig

[57] ABSTRACT

A small, compact motion detector alarm is sensitive to low frequency vibration (20 to 250 Hz) and emits an alarm sound when this vibration is detected. A piezoelectric transducer element serves as a low frequency sensor and also produces an alarm sound near its resonance, nominally 5 KHz. When low frequency vibrations occur, a detector formed of a amplifier and a current comparator actuates a one-shot which turns on an oscillator circuit to drive the transducer. A time out circuit disables the one-shot for a few seconds after the alarm has sounded, so that the device can return to its standby state. The alarm can be made to emit in the human audible range or in the ultrasonic range, which will be effective with pets but will not disturb humans.

8 Claims, 2 Drawing Sheets

AUDIBLE ALARM FOR MOTION DETECTION USING DUAL MODE TRANSDUCER

BACKGROUND OF THE INVENTION

This invention relates to audible alarm devices and is more particularly concerned with a device that detects motion as low frequency vibration and emits an audible high pitch or an ultrasonic tone.

The invention is more specifically directed to a simple, reliable, low-current-drain audible alarm circuit.

It has been desired to produce a simple and reliable alarm circuit which can serve as an intrusion alarm, or an alarm to shoo a cat, dog, or other pet away from furniture such as a chair or table. It has been discovered that vibrations in the range of about 20 Hz to 250 Hz are characteristic of the vibrations induced by a dog or cat walking on, landing on, or scratching a bed, chair, sofa, table, or shelf. However, there are at present no vibration alarms sensitive to low-frequency motion induced vibration. Instead, these conventional alarms are sensitive to high frequency sound, and can false-trigger by speech, hand claps, whistling, or other environmental sounds.

Also, in order to achieve long battery life, the device should have an extremely low current draw, on the order of a few microamps, while awaiting actuation. However, low power draw has been difficult to achieve.

A number of intrusion detectors on vibration detectors with audible alarms have been previously proposed. Several of these have attempted to use the same transducer both as a sensor and also as an audible sounder. Examples of such circuits are described in Morris U.S. Pat. No. 4,170,769; Kaminishi U.S. Pat. No. 4,470,040; and Hyman U.S. Pat. No. 4,974,850. These circuits rely on the resonance of the transducer to enhance detected signal strength of intruder-generated vibration to bring the signal strength to a level where a switching type oscillator can be actuated. This approach has several major deficiencies for the present purposes. First, detection is limited to frequencies around resonance, which is typically several kilohertz, for a cost-effective design. Thus low frequency vibrations, which are most characteristic of intrusion, go undetected. Second, the detector is very sensitive to ambient noises especially at frequencies near resonance. Thus, the system is highly susceptible to false triggering at frequencies near resonance. Third, these switching threshold circuits are quite sensitive to temperature and to supply voltage variation, and thus require additional components to adjust for these variations or to accommodate changes in environmental conditions.

OBJECTS AND SUMMARY OF THE INVENTION

It is an object of this invention to provide an audible alarm device that overcomes the drawbacks of the prior art in a simple circuit that employs a single transducer both for detection and for alarm, and which experiences extremely low current draw.

The present invention relies on the recognition that an edge clamped bimorph or unimorph piezoelectric transducer, or other similar device, will respond as an accelerometer at frequencies far below its fundamental resonance. With this in mind, the alarm circuit of this invention employs a low frequency linear amplifier in conjunction with the piezoelectric transducer to detect low frequency vibrations. These vibrations have to be in a band well below resonance, i.e., between 20 and 250 Hz where the transducer resonance is about 4 KHz, to prevent false triggering and to render the circuit relatively insensitive to temperature and voltage supply changes. Also the circuit consumes only a few microamperes of current.

In keeping with the invention, a low frequency vibration detecting circuit formed of this low frequency amplifier has an input coupled to the piezoelectric transducer and an output coupled to a one-shot circuit. The latter provides a drive enable signal to turn on an oscillator circuit. The oscillator circuit drives the piezoelectric transducer at a frequency near resonance, or in some cases above resonance. This oscillator frequency can be a few kilohertz (audible to humans) or perhaps 20 kilohertz or above (audible to pets, but not humans). The one-shot holds the alarm on for a short period, e.g. one or two seconds. An associated anti-retrigger time out circuit prevents a second actuation from re-sounding the alarm before some time period, greater than the settling time of the transducer and amplifier, has elapsed.

The above and many other objects, features, and advantages of this invention will become apparent from the ensuing description of a preferred embodiment, which should be read in conjunction with the accompanying Drawing:

DETAILED DESCRIPTION OF THE PREFERRED EMBODIMENT

Figure 1:
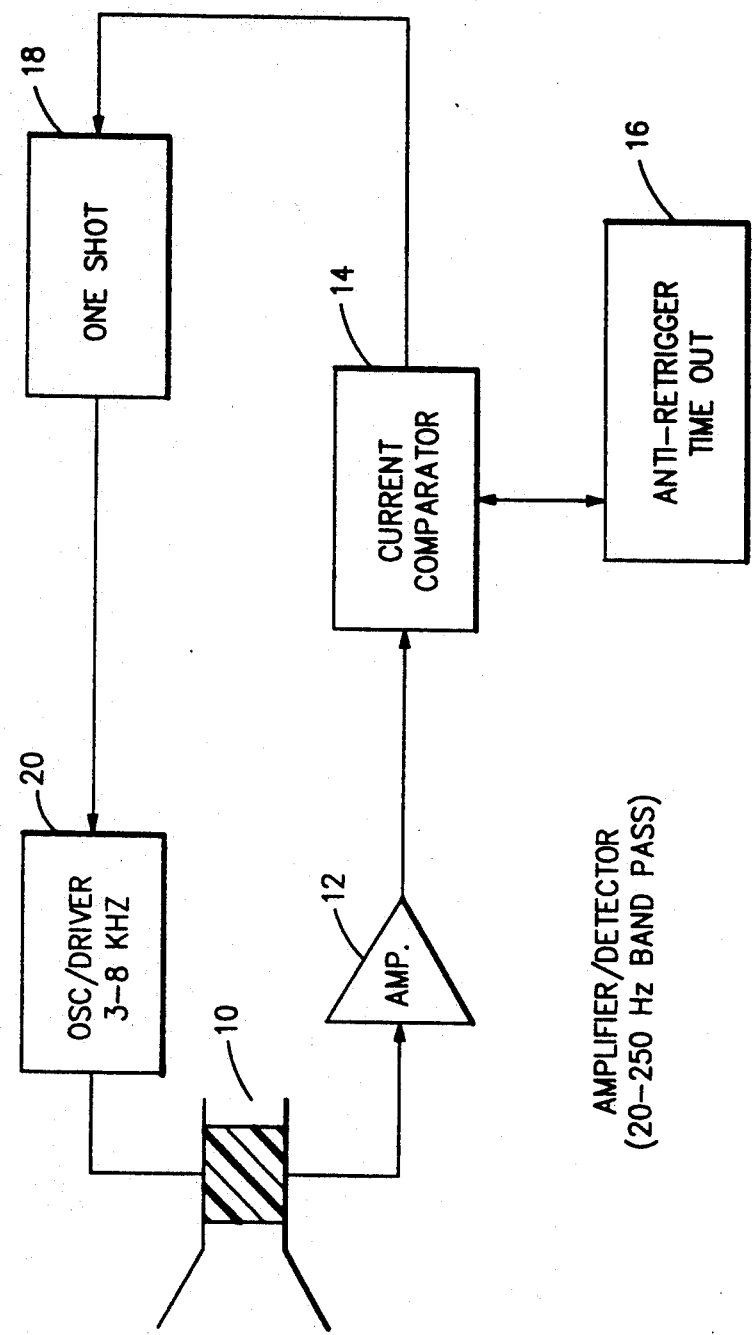
FIG. 1 is a schematic block diagram of the circuit of this invention.

With reference initially to FIG. 1 of the Drawing, a vibration detector alarm, such as a pet alert unit employs a piezoelectric sounder or transducer 10 both as a vibration detector and as an audible annunciator. By "audible" it is meant that the device emits either in human range, or above it but in the pet (i.e. canine) hearing range. The piezoelectric sounder 10 can be any of a variety of inexpensive, commonly available crystal or piezoceramic devices which have a fundamental or first harmonic of at least one KHz, usually between 3 KHz and 8 KHz. These are usually edge clamped devices, and serve as accelerometers for vibration frequencies well below resonance. In fact, the sounder 10 produces a signal on the order of about one millivolt for vibrations in the frequency range of 20 Hz to 250 Hz. Vibrations in this range are typical of those induced by a dog or cat landing on, walking on, or scratching the surface of a chair, bed, sofa, table top, counter top, shelf, or other furniture item that the owner desires to protect from the pet. When used as an accelerometer, the low frequency response limit ($-3$ dB) is determined by the product of the transducer capacitance and the amplifier input resistance. For the transducer 10 the capacitance below resonance is typically 20 nF, and a useful minimum input impedance is therefore about 500 kilohms. To prevent false triggering by ambient noise or background sounds the circuit must limit response above about 250 Hz and must maintain linearity in order to prevent ambient sounds from being frequency translated into the 20 to 250 Hz bandpass. Also, current draw in standby mode should be limited to a few microamps, not exceeding 50 microamps, to assure a reasonable battery life.

The circuit can be explained in basic terms in FIG. 1, where the motion induced vibration induces a signal in the transducer 10 and passes to a detector or sense amplifier 12. This amplifier or detector produces a low-level current which is compared with a threshold reference current set by current comparator 14 and if sufficient triggers a one-shot 18 which outputs an enable signal for a predetermined time period on the order of one second. A time out or inhibit circuit 16 coupled to the comparator 14 prevents the latter from being actuated a second time until some predetermined interval, greater than the settling time of the transducer and amplifier has elapsed. The enable signal is fed to an oscillator circuit 20 that drives the transducer 10 at or near its resonance so that it outputs a sufficiently shrill sound as an alarm.

Figure 2:
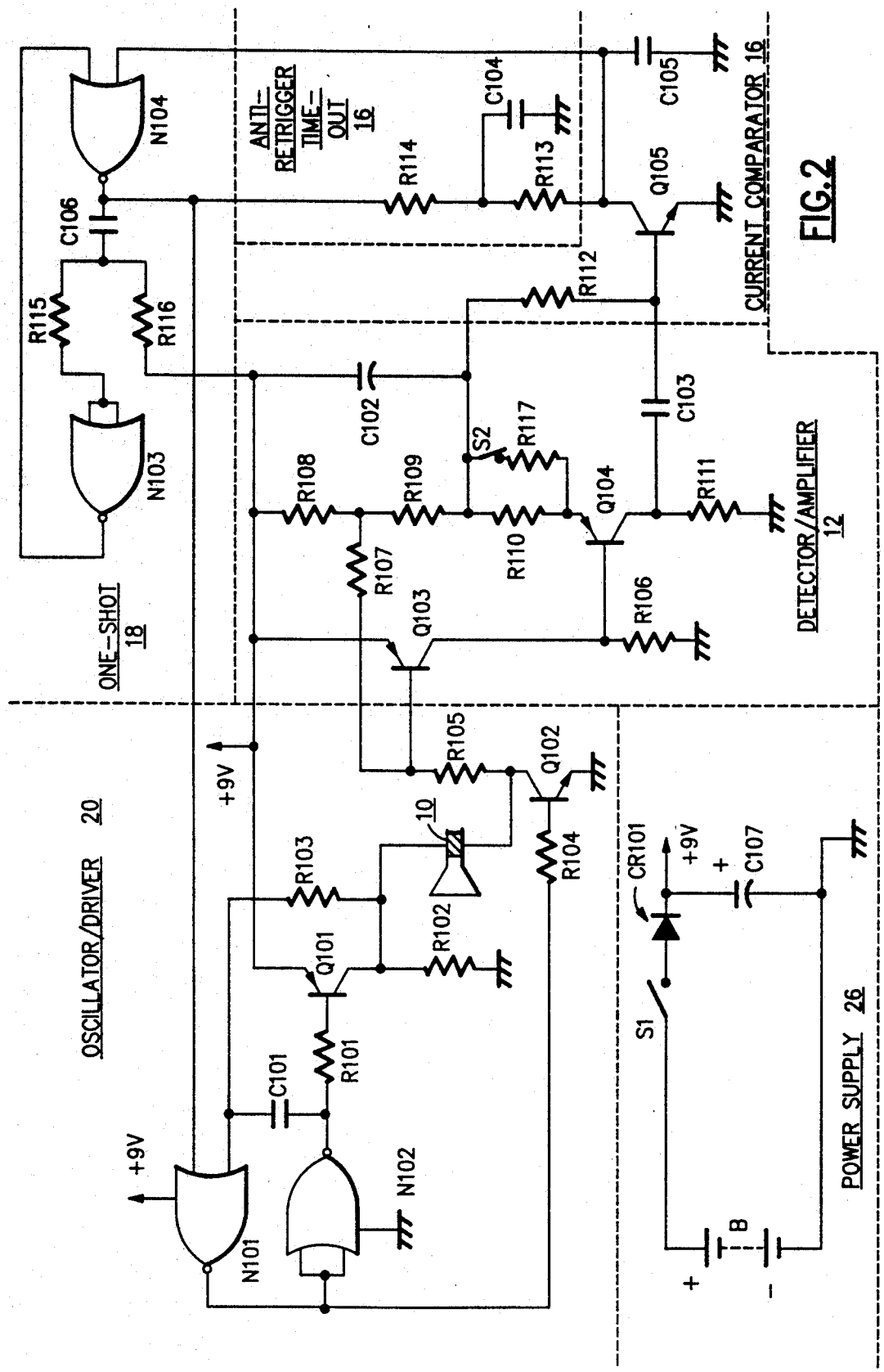
FIG. 2 is a schematic circuit diagram of one preferred embodiment of the invention.

FIG. 2 shows the circuit details of one preferred embodiment of the invention where broken lines indicate functional groups that are identified with reference numbers corresponding to those used in FIG. 1.

In this circuit the piezoelectric transducer 10 is coupled to an annunciator drive circuit 20 formed of transistors Q101 and Q102 coupled to the oscillator formed of logic NOR gates N101 and N102. The oscillator operates at a frequency determined by the values of a capacitor C101 coupled between the output of NOR gate N102 and the input of NOR gate N101 and a resistor R103 coupled between the input of NOR gate N101 and the collector of transistor Q101. An input resistor R101 couples the output of the gate N102 to the base of the transistor Q101 whose collector is coupled via a resistor R102 to ground. This transistor Q101 is a PNP transistor with its emitter connected to voltage supply +V, here e.g. +9 volts. The other transistor Q102 is NPN with its emitter grounded, and its base coupled via an input resistor R104 to the junction of the output of gate N101 and input of gate N102. A collector resistor R105 couples this transistor, through the emitter-base junction of transistor Q103, to voltage +V.

It should be appreciated that the transistors Q101 and Q102 are driven 180 degrees out of phase, and are coupled in what can be considered a modified push-pull bridge arrangement in respect to the transducer 10. The annunciator drive circuit 20 acts to switch the terminals of the transducer 10 from rail to rail, to generate an effective peak-to-peak level of twice the dc supply voltage +V.

The detector circuit 12 includes a sense amplifier gain block formed of transistors Q103 and Q104. Transistor Q103 (PNP) has its base joined to the resistor R105 and its collector grounded through a resistor R106 and also coupled to the base of transistor Q104. A feedback resistor R107 connects the base of transistor Q103 to the junction of resistors R108 and R109 which are placed in series with emitter resistor R110 for the transistor Q104. A collector resistor R111 joins the collector of PNP type transistor Q104 to ground, while resistor R108 is coupled to the supply voltage +V.

The quiescent operating emitter current of transistor Q104 is set by the resistor R108. The transistor Q103 will be operated by a collector current on the order of a few microamps, and thus its emitter-base junction voltage drop is approximately 0.5 volts, plus the voltage across the feedback resistor R107, which results from base current through transistor Q103. The value of resistor R109 is selected to fix the nominal potential at the junction of resistors R109 and R110 at one-half the supply voltage +V. This junction is heavily bypassed at signal frequencies by a parallel capacitor C102. Since signals are bypassed, the feedback path through resistor R107 serves only to stabilize the operating point of the transistor Q103. The input impedance of the gain block 12 is determined by the value of the resistor R107 in parallel with the input impedance of transistor Q103. The resistor R110 in conjunction with the intrinsic emitter resistance and current gain of the transistor Q104 determines the input impedance of the stage formed of this transistor Q104, and sets its transconductance. The voltage across resistance R110 is typically less than one volt. Hence the emitter of Q104 is held within a volt of one-half the supply voltage. It follows that the collector current of transistor Q103 is set by the value of its collector resistor R106 and the emitter potential of Q104 plus one junction drop. The input impedance for the transistor Q103 is determined by this collector current, and the current gain of transistor Q103 so the input impedance requirement cited above dictates the design center.

A current comparator 14 is coupled to the sense amplifier gain block 12, and includes an NPN transistor Q105 connected as a current-driven comparator. In normal operation, this transistor Q105 is biased on by a current supplied by an input resistor R112, which is coupled between the junction of resistors R109, R110 and the base of the transistor Q105, whose emitter is grounded. The R109 - R110 junction is a relatively hard node, as the transistor Q104 is acting as a shunt regulator to the load formed by resistor R112. The base current to transistor Q105 may be adjusted over a wide range without disturbing the gain of the block 12, to the limit that transistor Q104 is not current starved. The alarm one-shot 18 is triggered when transistor Q105 is switched off. This means that the trigger condition is that the base current into transistor Q105 is sunk into the collector output of the transistor Q104 during peaks of negative-going signal excursions. This occurs when peak signal voltage at the base of transistor Q104 times its transconductance equals the base current to transistor Q105 as programmed by the resistor R112. For this purpose the voltage drop across resistor R112 is substantially equal to the drop across the load resistor R106 for transistor Q103. Since the gain of the transistor Q103 is directly proportional to this voltage, while the comparator trigger level is inversely proportional to it, the composite sensitivity of the current comparator 24 is substantially independent of the supply voltage +V. Also, the compliance range of the stage formed by transistor Q104 must be sufficient to permit diversion of the base program current to transistor Q105 to ensure adequate triggering. An input capacitor C103 connects the collector of the transistor Q104 to the base of the transistor Q105.

Low frequency response can be further tailored by selection of emitter resistor R111 and input capacitor C103 to shape the low frequency compliance of the current comparator transistor Q105. High frequency response is controlled by a bypass capacitor C105 that is connected between the collector of the transistor Q105 and ground. This capacitor C105 in combination with a collector resistor R113 determines the slew rate of the collector of transistor Q105 and hence sets the minimum pulse width capable of raising the collector output to a trigger level for the one-shot 18.

The one-shot 18 is comprised of logic NOR gates N103 and N104 with the output of gate N103 feeding an input of the gate N104, and with the output of the gate N104 being coupled through a capacitor C106 and a resistor R115 to tied inputs of the gate N103. Another resistor R116 joins the junction of the capacitor C106 and resistor R115 to voltage+V. Another input of the gate N104 is connected to the collector of transistor Q105. The output of the gate N104 is also tied to one input of NOR gate N101 of the oscillator circuit 20 to enable same for the period of the one-shot 18.

Duration of the one-shot 18, which is the duration of an alarm sound, is determined by the values of capacitor C106 and resistor R116. The one-shot is triggered when collector voltage on transistor Q105 goes high, which makes one of the inputs of gate N104 high. This drives the gate output low, driving the inputs of gate N103 low. For the duration of the on-time of one-shot 18, the capacitor C104 is discharged through a resistor R114. Then, at the conclusion of an alarm cycle, the output of the gate N104 returns to a high state, which disables the oscillator and allows the capacitor C104 to charge up through a charging resistor R114 in series with resistor R113 and transistor Q105. Thus, resistor R114 and capacitor C104 serve as the time-out or inhibit circuit 16. The one-shot 18 cannot be retriggered until the capacitor C104 has charged up to a nominal 50% of supply voltage +V. This anti-retriggering function eliminates problematic retriggering caused by transducer ringing and amplifier recovery transients.

Also shown in FIG. 2 is a power supply circuit 26 formed of a nine-volt battery B, an on/off switch S1 joined with a power supply capacitor C107, and polarity protect diode CR101.

A sensitive select switch S2 is normally closed so that the parallel combination of resistors R110 and R117 determine the transconductance of the transistor Q104 amplifier stage. When switch S2 is open, the resistance rises to the valve of the resistor R110 alone. The effect is to decrease the transconductance of the Q104 amplifier and lower the voltage of the base of transistor Q104 which in turn lowers the collector current of transistor Q103. The net result is a decrease in sensitivity.

The capacitors and resistors as shown here can have the values as indicated in the following table:

| | |
|---|---|
| R101 | 10K |
| R102 | 470Ω |
| R103 | 560K |
| R104 | 10K |
| R105 | 470Ω |
| R106 | 1M |
| R107 | 470K |
| R108 | 33K |
| R109 | 220K |
| R110 | 68K |
| R111 | 100K |
| R112 | 2M |
| R113 | 2M |
| R114 | 33K |
| R115 | 1M |
| R116 | 100K |
| R117 | 220K |
| C101 | 220 pf |
| C102 | 22 uf |
| C103 | 0.1 uf |
| C104 | 470 pf |
| C105 | 3.3 uf |
| C106 | 3.3 uf |
| C107 | 220 uf |

The transistors are commonly available small-signal discrete transistors, and the NOR gates are formed as a CD 4001B Quad NOR gate integrated circuit. The piezoelectric transducer 10 can be any edge-clamped, unimorph or bimorph device. The components all fit compactly on a small circuit board within an enclosed housing of a few inches on a side. The device itself is sensitive to vibrations in the range mentioned above which are characteristic of motion-induced oscillations, but is insensitive to speech, music, or ambient noise. Because of the low standby current drain, the device can be left on, in either the high or low setting, for at least several months.

The invention is not limited only to the above described embodiment. Rather many possible modifications and variations will present themselves to those skilled in the art without departing from the scope and spirit of this invention, as defined in the appended claims:

What is claimed is:

1. Motion detector alarm that detects low-frequency motion-induced vibrations, and provides an alarm in response to detection of such vibration; comprising a piezoelectric transducer having a predetermined fundamental resonance frequency of at least about one KHz;

a low frequency detection circuit having an input coupled to said transducer, said frequency detection circuit being sensitive to vibrations at low frequencies extending from a low frequency threshold of about 20 Hz to a high frequency limit of several hundred Hz or below and well below said predetermined fundamental resonance frequency;

one-shot circuit means having an input triggered by said frequency detection circuit and providing a drive enable signal for a predetermined interval following detection of said low frequency vibrations; and an oscillator circuit enabled by said drive enable signal from said one-shot circuit means to drive said piezoelectric transducer at an alarm frequency near or above said predetermined fundamental frequency.

2. Motion detector alarm according to claim 1 wherein said transducer has a fundamental frequency of about 3 to 8 KHz.

3. Motion detector alarm according to claim 2 wherein said low frequency threshold is on the order of about 20 Hz, and said high frequency limit is about 250 Hz.

4. Motion detector alarm according to claim 1 further comprising drive circuit means coupling said oscillator circuit to said transducer for alternately coupling opposite terminals of the transducer respectively to a voltage source and to ground, and then respectively to ground and said voltage source.

5. Motion detector alarm according to claim 4 wherein said drive circuit means is operative for alternate half cycles of an output signal of said oscillator circuit to couple one terminal of the transducer to said voltage source while the other terminal thereof is coupled to ground, and in the intervening half cycles of the output signal of said oscillator circuit to couple said one terminal of the transducer to ground and the other terminal thereof to said voltage source.

6. Motion detector alarm according to claim 1 wherein said low frequency detection circuit includes a sense amplifier which amplifies voltage produced by said transducer in response to said low frequency vibrations, and a current comparator circuit coupled to the output of the sense amplifier, and producing a trigger signal to said one-shot circuit means if said low frequency vibrations cause said low frequency detection circuit to produce an output that exceeds a predetermined value.

7. Motion detector alarm according to claim 6 wherein said current comparator circuit includes a transistor and bias means for normally biasing said transistor to conduct, said transistor having a normal current draw on the order of a few microamperes.

8. Motion detector alarm according to claim 6 wherein said current comparator circuit includes time out circuit means coupled to disable the current comparator circuit from triggering said one-shot circuit means for a time-out period of greater duration than a predetermined ringing time of the transducer and amplifier.

* * * * *